United States Patent
Chen et al.

(10) Patent No.: US 11,425,749 B2
(45) Date of Patent: Aug. 23, 2022

(54) INFORMATION SENDING METHOD, APPARATUS, SYSTEM, RELATED DEVICE, AND STORAGE MEDIUM

(71) Applicant: ZTE CORPORATION, Shenzhen (CN)

(72) Inventors: Yijian Chen, Shenzhen (CN); Zhaohua Lu, Shenzhen (CN); Yu Ngok Li, Shenzhen (CN); Bo Gao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 562 days.

(21) Appl. No.: 16/346,489

(22) PCT Filed: Nov. 3, 2017

(86) PCT No.: PCT/CN2017/109368
§ 371 (c)(1),
(2) Date: Jan. 14, 2020

(87) PCT Pub. No.: WO2018/082664
PCT Pub. Date: May 11, 2018

(65) Prior Publication Data
US 2020/0214031 A1 Jul. 2, 2020

(30) Foreign Application Priority Data
Nov. 3, 2016 (CN) .......................... 201610974050.9

(51) Int. Cl.
*H04W 72/12* (2009.01)
(52) U.S. Cl.
CPC ... *H04W 72/1289* (2013.01); *H04W 72/1284* (2013.01)

(58) Field of Classification Search
None
See application file for complete search history.

(56) References Cited

U.S. PATENT DOCUMENTS

| 2008/0212531 A1* | 9/2008 | Park | H04L 5/0007 370/329 |
|---|---|---|---|
| 2009/0213766 A1* | 8/2009 | Chindapol | H04W 72/005 370/278 |

(Continued)

FOREIGN PATENT DOCUMENTS

| CN | 102098146 A | 6/2011 |
|---|---|---|
| CN | 102281518 A | 12/2011 |

(Continued)

OTHER PUBLICATIONS

First Search Report for CN App No. 201610974050.9.

(Continued)

*Primary Examiner* — Andrew C Oh
(74) *Attorney, Agent, or Firm* — Knobbe, Martens, Olson & Bear, LLP (57) ABSTRACT

Disclosed is an information sending method. The method includes: determining first sending configuration information corresponding to downlink information; determining second sending configuration information corresponding to uplink information associated with the downlink information according to the first sending configuration information; and sending the uplink information according to the second sending configuration information. Also disclosed are an information sending apparatus and system, a base station, a terminal, and a computer-readable storage medium.

20 Claims, 3 Drawing Sheets

```
┌─────────────────────────────────────────────────────────────┐
│ Determine third sending configuration information           │      201
│              corresponding to uplink information            │─────
└─────────────────────────────────────────────────────────────┘
                              │
                              ▼
┌─────────────────────────────────────────────────────────────┐
│ Determine, according to the third sending configuration     │
│ information, fourth sending configuration information       │      202
│ corresponding to downlink information associated with the   │─────
│                    uplink information                       │
└─────────────────────────────────────────────────────────────┘
                              │
                              ▼
┌─────────────────────────────────────────────────────────────┐
│   Send the downlink information according to the fourth    │      203
│              sending configuration information              │─────
└─────────────────────────────────────────────────────────────┘
```

(56) References Cited

U.S. PATENT DOCUMENTS

| | | | |
|---|---|---|---|
| 2010/0309836 A1* | 12/2010 | Sugawara | H04W 72/1231 370/312 |
| 2010/0311430 A1* | 12/2010 | Katayama | H04L 5/0007 455/450 |
| 2011/0038302 A1* | 2/2011 | Papasakellariou | H04W 72/042 370/315 |
| 2011/0287804 A1* | 11/2011 | Seo | H04W 52/146 455/522 |
| 2012/0069803 A1* | 3/2012 | Iwamura | H04W 72/1278 370/329 |
| 2013/0051355 A1* | 2/2013 | Hong | H04L 5/001 370/329 |
| 2013/0128857 A1* | 5/2013 | Nakao | H04W 74/006 370/329 |
| 2013/0301575 A1 | 11/2013 | Wang et al. | |
| 2013/0336273 A1* | 12/2013 | Takeda | H04W 72/14 370/329 |
| 2014/0153390 A1* | 6/2014 | Ishii | H04L 47/12 370/230 |
| 2014/0161060 A1* | 6/2014 | Nam | H04L 1/1692 370/329 |
| 2014/0177586 A1* | 6/2014 | Jang | H04L 5/0053 370/329 |
| 2014/0198761 A1 | 7/2014 | Hooli et al. | |
| 2014/0269454 A1* | 9/2014 | Papasakellariou | H04L 5/1469 370/280 |
| 2014/0341151 A1* | 11/2014 | Yang | H04L 1/1822 370/329 |
| 2014/0369294 A1* | 12/2014 | Seo | H04L 27/2636 370/329 |
| 2015/0215944 A1* | 7/2015 | Kim | H04L 5/001 370/329 |
| 2015/0223234 A1* | 8/2015 | Seo | H04W 72/0473 370/329 |
| 2015/0312071 A1* | 10/2015 | Chen | H04L 1/0029 370/329 |
| 2015/0341866 A1* | 11/2015 | Park | H04L 1/1812 370/280 |
| 2015/0358918 A1* | 12/2015 | Gao | H04W 72/0413 455/522 |
| 2015/0358924 A1* | 12/2015 | Papasakellariou | H04W 72/0473 370/329 |
| 2016/0050706 A1* | 2/2016 | Zhang | H04W 76/30 370/280 |
| 2016/0056942 A1* | 2/2016 | Wang | H04L 5/0058 370/330 |
| 2016/0057744 A1 | 2/2016 | Pan et al. | |
| 2016/0150510 A1* | 5/2016 | Shao | H04W 72/042 370/329 |
| 2016/0219618 A1 | 7/2016 | Rico Alvarino et al. | |
| 2016/0374027 A1* | 12/2016 | Dinan | H04W 52/50 |
| 2017/0013565 A1* | 1/2017 | Pelletier | H04W 52/367 |
| 2017/0187494 A1* | 6/2017 | Tirronen | H04W 72/0413 |
| 2017/0202025 A1* | 7/2017 | Ouchi | H04W 52/346 |
| 2017/0230913 A1* | 8/2017 | Ouchi | H04W 74/0833 |
| 2018/0006790 A1* | 1/2018 | Park | H04L 1/1671 |
| 2018/0020430 A1* | 1/2018 | Aiba | H04W 24/10 |
| 2018/0027549 A1* | 1/2018 | Wang | H04L 5/0055 370/329 |
| 2018/0048498 A1* | 2/2018 | Stern-Berkowitz | H04W 16/14 |
| 2018/0139731 A1* | 5/2018 | Suzuki | H04L 1/1822 |
| 2018/0213484 A1* | 7/2018 | Oh | H04W 52/42 |
| 2018/0235003 A1* | 8/2018 | Wong | H04L 1/1864 |
| 2019/0132101 A1* | 5/2019 | Priyanto | H04L 5/0053 |
| 2021/0212054 A1* | 7/2021 | Xiong | H04L 5/1469 |

FOREIGN PATENT DOCUMENTS

| | | |
|---|---|---|
| CN | 102469587 A | 5/2012 |
| CN | 102547986 A | 7/2012 |
| CN | 102594438 A | 7/2012 |
| CN | 103299695 A | 9/2013 |
| CN | 103380639 A | 10/2013 |
| CN | 103503514 A | 1/2014 |
| CN | 104104465 A | 10/2014 |
| WO | 2013023681 A1 | 2/2013 |
| WO | WO 2014/021664 A1 | 2/2014 |

OTHER PUBLICATIONS

First Office Action for CN App No. 201610974050.9.
International Search Report dated Jan. 31, 2018 for International Application No. PCT/CN2017/109368, 5 pages.
Written Opinion of the International Searching Authority dated Jan. 31, 2018 for International Application No. PCT/CN2017/109368, 3 pages.
ZTE, "Uplink Data Scheduling and Transmission for NR Frame Structure", 3GPP TSG RAN WG1 Meeting #86, R1-166407, Aug. 26, 2016, section 3.

* cited by examiner

INFORMATION SENDING METHOD, APPARATUS, SYSTEM, RELATED DEVICE, AND STORAGE MEDIUM

CROSS-REFERENCES TO RELATED APPLICATIONS

This is a National Stage Application, filed under 35 U.S.C. 371, of International Patent Application No. PCT/CN2017/109368, filed on Nov. 3, 2017, which claims priority to a Chinese patent application No. 201610974050.9 filed on Nov. 3, 2016, disclosures of which are incorporated herein by reference in their entireties.

TECHNICAL FIELD

The present disclosure relates to communication technology and, in particular, to an information sending method, apparatus and system, related devices, and a computer-readable storage medium.

BACKGROUND

In the fifth-generation mobile communication technology (5G), the control information (including uplink and downlink control channels) may have multiple transmission configurations. The selection of the transmission configurations of the control information reflects some pieces of judgment information obtained by a base station or a terminal judging on uplink or downlink quality.

In related art, one selection manner of the transmission configurations of the control information is that a set including multiple transmission configurations for the downlink (a transmission direction from the base station to the terminal) and a set including multiple transmission configurations for the uplink (a transmission direction from the terminal to the base station) are determined respectively, and the base station and the terminal independently select the downlink or uplink transmission configuration based on the sets respectively. In this case, if the base station and the terminal separately select the transmission configuration, the base station and the terminal respectively perform link judgement according to some signals which may be measured by themselves. In this way, the base station and the terminal often have different judgments on link quality, that is, transmission policies of the uplink and downlink are inconsistent, thereby resulting in transmission performance loss.

SUMMARY

Embodiments of the present disclosure provide an information sending method, apparatus and system, related devices, and a computer-readable storage medium.

An embodiment of the present disclosure provides an information sending method. The method includes: determining first sending configuration information corresponding to downlink information; determining, according to the first sending configuration information, second sending configuration information corresponding to uplink information associated with the downlink information; and sending the uplink information according to the second sending configuration information.

In the above solution, the downlink information is downlink control information, and the uplink information is uplink control information.

In the above solution, the downlink control information is uplink scheduling grant information, and correspondingly, the uplink control information is at least one of: measurement feedback information, a reply message for downlink transmission, uplink or downlink beam handover request indication information, or link quality state information.

In the above solution, the downlink control information is downlink scheduling grant information, and correspondingly, the uplink control information is at least one of: measurement feedback information, a reply message for downlink transmission, a scheduling request (SR) message, uplink or downlink beam handover request indication information, or link quality state information.

In the above solution, the downlink control information is a reply message for uplink transmission, and correspondingly, the uplink control information is at least one of: measurement feedback information, a reply message for downlink transmission, an SR, uplink or downlink beam handover request indication information, or link quality state information.

In the above solution, the downlink control information is power control parameter configuration information, and correspondingly, the uplink control information is at least one of: uplink measurement feedback information, uplink or downlink beam handover request indication information, a reply message for downlink transmission, or link quality state information.

In the above solution, the downlink control information is sending or receiving parameter configuration information, and correspondingly, the uplink control information is at least one of: measurement feedback information, a reply message for downlink transmission, or an SR.

In the above solution, the downlink control information is feedback triggering indication information, and correspondingly, the uplink control information is uplink feedback information triggered by the feedback triggering indication information; or the downlink control information is pilot triggering indication information, and correspondingly, the uplink control information is feedback information corresponding to measuring based on the pilot.

In the above solution, the downlink information is downlink control information, and correspondingly, the uplink information is at least one of: uplink data information, uplink pilot information, or uplink random access information.

In the above solution, in response to determining that the uplink information is the uplink random access information, the downlink control information is at least one of: random access configuration information, or random access triggering information.

In the above solution, the uplink information is the uplink pilot information, and the downlink control information is at least one of: uplink pilot configuration information, uplink pilot triggering information, or power control parameter configuration information.

In the above solution, the downlink information is downlink data information, and correspondingly, the uplink information is at least one of: uplink control information, uplink data information, or uplink random access information.

In the above solution, the method further includes: determining the uplink information associated with the downlink information based on a configured or pre-agreed association relationship of information.

In the above solution, determining, according to the first sending configuration information, the second sending configuration information corresponding to the uplink information associated with the downlink information includes:

according to a configured or pre-agreed association relationship of transmission configuration information and in conjunction with the first sending configuration information, determining the second sending configuration information corresponding to the uplink information associated with the downlink information.

In the above solution, the second sending configuration information includes at least one of: a configuration of numerology, a configuration of transmission area, a configuration of sending code sequence set, a configuration of sending power, a configuration of sending times, a configuration of sending resource quantity, a configuration of modulation manner, a configuration of coding manner, a configuration of sending manner, a configuration of receiving manner, a configuration of transmission technology, or a configuration of demodulation pilot.

An embodiment of the present disclosure further provides an information sending method. The method includes: determining third sending configuration information corresponding to uplink information; determining, according to the third sending configuration information, fourth sending configuration information corresponding to downlink information associated with the uplink information; and sending the downlink information according to the fourth sending configuration information.

In the above solution, the uplink information is uplink control information, and correspondingly, the associated downlink information is downlink control information.

In the above solution, the uplink control information is measurement feedback information, and correspondingly, the downlink control information is at least one of: uplink scheduling grant information, downlink scheduling grant information, power control information, sending or receiving parameter configuration information, feedback triggering indication information, or pilot triggering indication information.

In the above solution, the uplink control information is a reply message for downlink transmission, and correspondingly, the downlink control information is at least one of: uplink scheduling grant information, downlink scheduling grant information, power control information, sending or receiving parameter configuration information, feedback triggering indication information, or pilot triggering indication information.

In the above solution, the uplink control information is uplink or downlink beam handover request indication information, and correspondingly, the downlink control information is at least one of: uplink scheduling grant information, downlink scheduling grant information, power control information, sending or receiving parameter configuration information, feedback triggering indication information, or pilot triggering indication information.

In the above solution, the uplink control information is link quality state information, and correspondingly, the downlink control information is at least one of: uplink scheduling grant information, downlink scheduling grant information, power control information, sending or receiving parameter configuration information, feedback triggering indication information, or pilot triggering indication information.

In the above solution, the uplink control information is an SR, and correspondingly, the associated downlink control information is at least one of: uplink scheduling grant information, downlink scheduling grant information, power control information, sending or receiving parameter configuration information, feedback triggering indication information, or pilot triggering indication information.

In the above solution, the uplink information is uplink data information, and correspondingly, the downlink information is at least one of: downlink control information, or downlink data information.

In the above solution, the uplink information is uplink random access information, and correspondingly, the downlink information is at least one of: downlink control information, downlink data information, or downlink random access response information.

In the above solution, the uplink information is uplink control information, and correspondingly, the downlink information is downlink data information.

In the above solution, the method further includes: determining the downlink information associated with the uplink information based on a configured or pre-agreed association relationship of information.

In the above solution, determining, according to the third sending configuration information, the fourth sending configuration information corresponding to the downlink information associated with the uplink information includes: according to a configured or pre-agreed association relationship of transmission configuration information and in conjunction with the third sending configuration information, determining the fourth sending configuration information corresponding to the downlink information associated with the uplink information.

In the above solution, the downlink sending configuration information includes at least one of: a configuration of numerology, a configuration of transmission area, a configuration of sending code sequence set, a configuration of sending power, a configuration of sending times, a configuration of sending resource quantity, a configuration of modulation manner, a configuration of coding manner, a configuration of sending manner, a configuration of receiving manner, a configuration of transmission technology, or a configuration of demodulation pilot.

An embodiment of the present disclosure further provides an information sending apparatus. The apparatus includes: a first determining unit, which is configured to determine first sending configuration information corresponding to downlink information; a second determining unit, which is configured to determine, according to the first sending configuration information, second sending configuration information corresponding to uplink information associated with the downlink information; and a first sending unit, which is configured to send the uplink information according to the second sending configuration information.

In the above solution, the apparatus further includes: a third determining unit, which is configured to determine the uplink information associated with the downlink information based on a configured or pre-agreed association relationship of information.

In the above solution, the second determining unit is configured to: determine the second sending configuration information corresponding to the uplink information associated with the downlink information in conjunction with the first sending configuration information and according to a configured or pre-agreed association relationship of transmission configuration information.

An embodiment of the present disclosure further provides an information sending apparatus. The apparatus includes: a fourth determining unit, which is configured to determine third sending configuration information corresponding to uplink information; a fifth determining unit, which is configured to determine, according to the third sending configuration information, fourth sending configuration information corresponding to downlink information associated with the uplink information; and a second sending unit, which is configured to send the downlink information according to the fourth sending configuration information.

In the above solution, the apparatus further includes: a sixth determining unit, which is configured to determine the downlink information associated with the uplink information based on a configured or pre-agreed association relationship of information.

In the above solution, the fifth determining unit is configured to: determine the fourth sending configuration information corresponding to the downlink information associated with the uplink information in conjunction with the third sending configuration information and according to a configured or pre-agreed association relationship of transmission configuration information.

An embodiment of the present disclosure further provides a terminal. The terminal includes: a first controller, which is configured to determine first sending configuration information corresponding to downlink information, and determine, according to the first sending configuration information, second sending configuration information corresponding to uplink information associated with the downlink information; and a first communicator, which is configured to send the uplink information according to the second sending configuration information.

In the above solution, the first controller is further configured to determine the uplink information associated with the downlink information based on a configured or pre-agreed association relationship of information.

In the above solution, the first controller is configured to: according to a configured or pre-agreed association relationship of transmission configuration information and in conjunction with the first sending configuration information, determine the second sending configuration information corresponding to the uplink information associated with the downlink information.

An embodiment of the present disclosure further provides a base station. The base station includes: a second controller, which is configured to determine third sending configuration information corresponding to uplink information, and determine, according to the third sending configuration information, fourth sending configuration information corresponding to downlink information associated with the uplink information; and a second communicator, which is configured to send the downlink information according to the fourth sending configuration information.

In the above solution, the second controller is further configured to determine the downlink information associated with the uplink information based on a configured or pre-agreed association relationship of information.

In the above solution, the second controller is configured to: determine, according to an association relationship of configured or pre-agreed transmission configuration information and in conjunction with the third sending configuration information, the fourth sending configuration information corresponding to the downlink information associated with the uplink information.

An embodiment of the present disclosure further provides an information sending system. The system includes: a terminal and a base station.

The terminal is configured to determine first sending configuration information corresponding to first downlink information; determine, according to the first sending configuration information, second sending configuration information corresponding to first uplink information associated with the first downlink information; and send the first uplink information according to the second sending configuration information.

The base station is configured to determine third sending configuration information corresponding to the first uplink information; determine, according to the third sending configuration information, fourth sending configuration information corresponding to second downlink information associated with the first uplink information; and send the second downlink information according to the fourth sending configuration information.

In the above solution, the terminal is further configured to determine the first uplink information associated with the first downlink information based on a configured or pre-agreed association relationship of information.

In the above solution, the base station is further configured to determine the second downlink information associated with the first uplink information based on a configured or pre-agreed association relationship of information.

An embodiment of the present disclosure further provides a computer-readable storage medium.

The information sending method, apparatus and system, related devices and the computer-readable storage medium provided by the embodiments of the present disclosure determine first sending configuration information corresponding to downlink information, determine second sending configuration information corresponding to uplink information associated with the downlink information according to the first sending configuration information, send the uplink information according to the second sending configuration information, determine third sending configuration information corresponding to uplink information, determine fourth sending configuration information corresponding to downlink information associated with the uplink information according to the third sending configuration information, and send the downlink information according to the fourth sending configuration information. Therefore, in the process of sending uplink information and downlink information, the association between the uplink and downlink is considered, so that the association between the uplink and downlink when affected by the moving or blocking is considered, thereby effectively improving the transmission performance.

DETAILED DESCRIPTION

Hereinafter the present disclosure will be further described in detail in conjunction with the drawings and embodiments.

Before descriptions of embodiments of the present disclosure, the related art will be described.

In a communication system, several types of channels or signals usually exist on a physical layer, which include a downlink control channel, a downlink data channel, an uplink control channel, and an uplink data channel. The data channel is also referred to as a shared channel.

The downlink control channel is mainly configured to: send uplink and downlink scheduling grants and related transmission parameter assignment information to a terminal; feed uplink transmission reply information (acknowledgement/non-acknowledgement (ACK/NACK)) back to the terminal; trigger some measurement pilot signals; trigger feedback of channel state information (CSI), etc.

The uplink control channel is mainly configured to: send a scheduling request (SR) to request an evolved node B (eNB) for an uplink shared channel (UL-SCH) resource; send the ACK/NACK to reply downlink data/control information sent in a physical downlink shared channel (PDSCH)/a physical downlink control channel (PDCCH); and send the CSI including information about channel quality indication (CQI), precoding matrix indication information (PMI), channel rank indication (RI) and measurement pilot selection information (CRI), where the sent CSI is used for informing the eNB of downlink channel quality to help the eNB perform downlink scheduling. In addition, the uplink control channel is further configured to send beam state information and a beam/sending mechanism handover request.

The downlink data channel is mainly configured to send some pieces of downlink data information, and is also configured to transmit some pieces of high-layer control information, where a physical layer is the lowest layer, and layers other than the physical layer are the higher layers.

The uplink data channel is mainly configured to send uplink data information. It is to be illustrated that some resources in the uplink data channel may also be allocated for the transmission of part types of control information. In this case, the uplink control channel may not be additionally transmitted. This situation is suitable for a case where both the data and the control information in the uplink need to be sent.

In the fourth mobile communication technology (4G), the transmission manner of the uplink and downlink control channels is relatively fixed, which adopts a relatively robust design and is defined by the standards and has a relatively simple design and smaller configurable space. In the fifth-generation mobile communication technology (5G), the control information (including uplink and downlink control channels) may have multiple transmission configurations. These transmission configurations may respectively correspond to different transmission technologies and different transmission areas, or different sending/receiving beams, or different modulation coding schemes, or different sending code sequences. For example, assuming that there is a transmission configuration with high robustness. When multiple beams are sent, this transmission configuration may resist a beam change or path blocking which are caused by moving, so that more resources may be occupied and thus there is a better combining gain. Then, a more robust modulation coding scheme is used to achieve a small error bit rate, and a larger bandwidth is mapped on the frequency domain to achieve a good frequency domain diversity gain and an interference randomization effect. In addition, there may be other transmission configurations. Other transmission configurations may occupy fewer beams, so best beams may be selected according to CSI, best resource blocks may be selected for transmission according to feedback in the frequency domain, and a higher-order modulation coding scheme may be used, thereby having higher transmission efficiency.

In fact, a selection of control channel transmission configurations reflects some pieces of information of judgement of the base station or the terminal on uplink or downlink quality. For example, if a robust transmission configuration is selected, it means that a transmission link needs to be concerned, and a bit error rate is required to be better protected. If an efficient transmission configuration is selected, it means that a current transmission link is considered to be very reliable, and a transmission rate is required to be increased as much as possible.

In the relate art, a manner of selecting a control channel transmission configuration is that an uplink or a downlink respectively determines a set including multiple transmission configurations, and the base station and the terminal independently select the downlink or uplink transmission configuration based on the set respectively. In this case, the base station and the terminal respectively determine link quality according to some signals that may be measured by the base station and the terminal respectively. Thus, a situation often occurs in which the base station and the terminal have different judgments on the link quality. For example, the terminal considers that a downlink communication link is already unreliable but the base station still considers that the downlink communication link is reliable; or the base station considers that an uplink communication link is unreliable but the terminal does not realize that there are some problems in the uplink communication link. Therefore, a situation may occur that: in a short period of time, the downlink adopts a robust manner for transmission to resist against moving or blocking, but the uplink adopts a high transmission efficiency manner for transmission; or the uplink adopts the robust manner for transmission to resist against moving or blocking, but the downlink adopts the high transmission efficiency manner for transmission. In the other hand, after careful research, it is found that there are many cases in the actual application process that the uplink and downlink are affected simultaneously although the uplink and downlink do not have a perfect reciprocity. For example, following cases will simultaneously affect the uplink and downlink: inaccurate channel information caused by moving or transmission of a certain direction interrupted due to path blocking. Therefore, the inconsistency of the uplink and downlink transmission policies described above in a short period of time will damage transmission performance, and thus this situation should be avoided.

As can be seen from the above description, the selection mechanism in the related art does not fully utilize some associations of the uplink and downlink when affected by moving or blocking.

In view of this, in various embodiments of the present disclosure, pieces of information of the uplink and downlink are associated, and according to transmission configuration information of one type of information, transmission configuration information of another type of information associated with the above type of information is determined.

Embodiment 1

Figure 1:
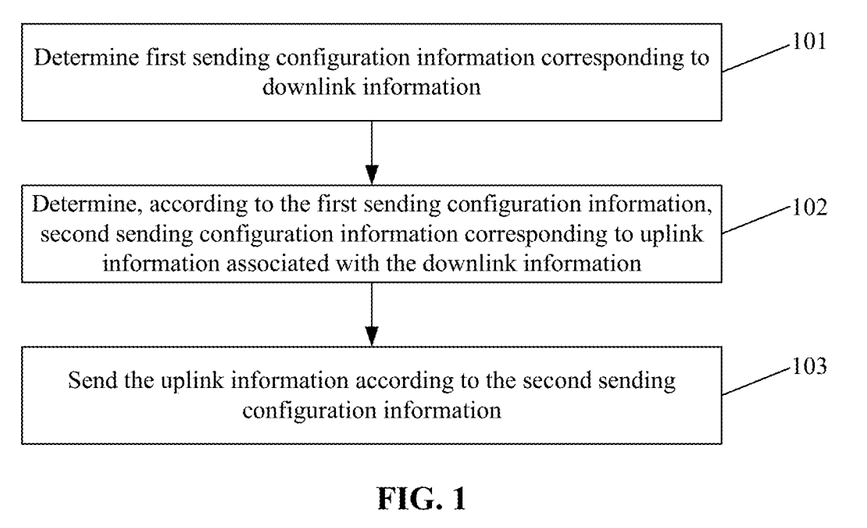
FIG. 1 is a flowchart of an information sending method according to an embodiment 1 of the present disclosure.

An information sending method of this embodiment is applied to a terminal. As shown in FIG. 1, the method includes steps described below.

In step 101, first sending configuration information corresponding to downlink information is determined.

In practical applications, there are many specific implementation manners for determining the first sending configuration information corresponding to the downlink information. For example, the terminal may determine the first sending configuration information corresponding to the downlink information based on a detection result of a channel, or may determine the first sending configuration information corresponding to the downlink information through signaling sent by the base station, or may also determine the first sending configuration information corresponding to the downlink information in an agreed manner.

In step 102, second sending configuration information corresponding to uplink information associated with the downlink information is determined according to the first sending configuration information.

In step 103, the uplink information is sent according to the second sending configuration information.

In an embodiment, the downlink information is downlink control information, and correspondingly the uplink information is uplink control information.

Specifically, the downlink control information may be uplink scheduling grant information (UL Grant), and correspondingly, the uplink control information may be at least one of: measurement feedback information, a reply message for downlink transmission, uplink or downlink beam handover request indication information, or link quality state information.

The measurement feedback information may be CSI or beam state information (BSI), etc.

The reply message for downlink transmission may be ACK/NACK, or may be ACK only.

The downlink control information may further be downlink scheduling grant information (DL Grant), and correspondingly, the uplink control information may be at least one of: measurement feedback information, a reply message for downlink transmission, an SR, uplink or downlink beam handover request indication information, or link quality state information.

The measurement feedback information may be CSI or BSI, etc.

The reply message for downlink transmission may be ACK/NACK, or may be ACK only.

The downlink control information may further be a reply message for uplink transmission, and correspondingly, the uplink control information may be at least one of: measurement feedback information, a reply message for downlink transmission, an SR, uplink or downlink beam handover request indication information, or link quality state information.

The measurement feedback information may be CSI or BSI, etc.

The downlink control information may further be power control parameter configuration information, and correspondingly, the uplink control information may be at least one of: uplink measurement feedback information, uplink or downlink beam handover request indication information, a reply message for downlink transmission, or link quality information.

The measurement feedback information may be CSI or BSI, etc.

The reply message for downlink transmission may be ACK/NACK, or may be ACK only.

The downlink control information may further be sending or receiving parameter configuration indication information, and correspondingly, the uplink control information may be at least one of: measurement feedback information, a reply message for downlink transmission, or an SR.

The measurement feedback information may be CSI or BSI, etc.

The reply message for downlink transmission may be ACK/NACK, or may be ACK only.

The downlink control information may further be feedback triggering indication information, and correspondingly, the uplink control information is uplink feedback information triggered by the feedback triggering indication information.

The downlink control information may further be pilot triggering indication information, and correspondingly, the uplink control information is feedback information corresponding to measuring based on the pilot.

In an embodiment, the downlink information is downlink control information, and correspondingly, the uplink information may be at least one of: uplink data information, uplink pilot information, or uplink random access information.

In response to determining that the uplink information is the uplink pilot information, the downlink control information may be at least one of: uplink pilot configuration information, uplink pilot triggering information, or power control parameter configuration information.

In response to determining that the uplink information is the uplink random access information, the downlink control information may be at least one of: random access configuration information, or random access triggering information.

In an embodiment, the downlink information may be downlink data information, and correspondingly, the uplink information is uplink control information.

In practical applications, the downlink information may further be downlink data information, and correspondingly, the uplink information is uplink data information.

The downlink information may further be downlink data information, and correspondingly, the uplink information is the uplink random access information.

In practical applications, an association relationship of information may be configured by the base station, or may be pre-agreed by the terminal and the base station.

That is, the uplink information associated with the downlink information is determined based on the configured or pre-agreed association relationship of information.

The association relationship of the transmission configuration information, that is, an association relationship between the sending configuration information corresponding to the downlink information and the sending configuration information corresponding to the uplink information associated with the downlink information, may be configured or pre-agreed by the base station.

That is, in the step 102, the terminal, according to the configured or pre-agreed association relationship of transmission configuration information and in conjunction with the first sending configuration information, determines the second sending configuration information corresponding to the uplink information associated with the downlink information.

In practical applications, the downlink sending configuration information may include at least one of: a configuration of numerology, a configuration of transmission area, a configuration of sending code sequence set, a configuration of sending power, a configuration of sending times, a configuration of sending resource quantity, a configuration of modulation manner, a configuration of coding manner, a configuration of sending manner, a configuration of receiving manner, a configuration of transmission technology, or a configuration of demodulation pilot.

It is to be illustrated that the uplink refers to a direction in which the terminal sends information to the base station; and the downlink refers to a direction in which the base station sends information to the terminal.

The information sending method provided in this embodiment determines first sending configuration information corresponding to downlink information, determines second sending configuration information corresponding to uplink information associated with the downlink information according to the first sending configuration information corresponding to the downlink information, and sends the uplink information according to the second sending configuration information. In the process of sending the uplink information, the association between the uplink and downlink when are affected by the moving or blocking is considered, thereby effectively improving the transmission performance.

Embodiment 2

Figure 2:
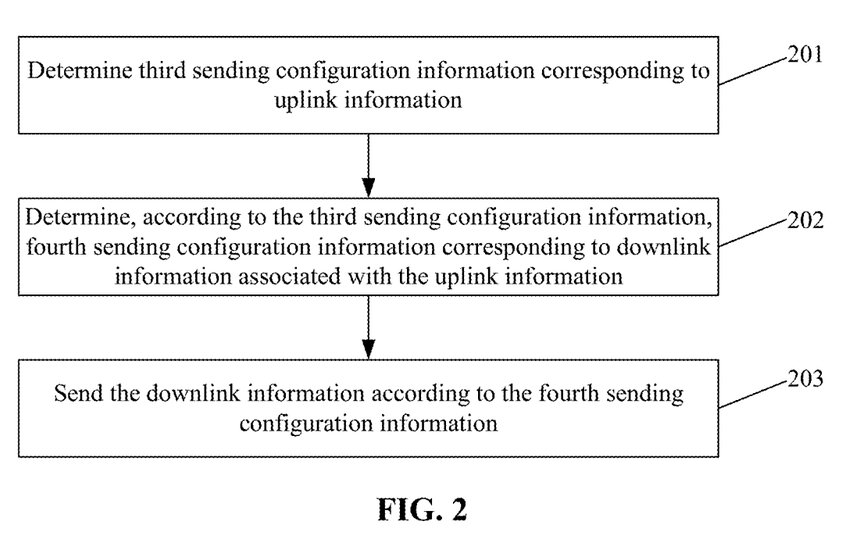
FIG. 2 is a flowchart of an information sending method according to an embodiment 2 of the present disclosure.

An information sending method of this embodiment is applied to a base station. As shown in FIG. 2, the method includes steps described below.

In step 201, third sending configuration information corresponding to uplink information is determined.

In practical applications, there are many specific implementation manners for determining the third sending configuration information corresponding to the uplink information. For example, the base station may determine the third sending configuration information corresponding to the uplink information based on a detection result of a channel, or determine the third sending configuration information corresponding to the uplink information in an agreed manner.

In step 202, fourth sending configuration information corresponding to downlink information associated with the uplink information is determined according to the third sending configuration information.

In step 203, the downlink information is sent according to the fourth sending configuration information.

In an embodiment, the uplink information is uplink control information, and correspondingly, the associated downlink information is downlink control information.

Specifically, the uplink control information may be measurement feedback information, and correspondingly, the downlink control information is at least one of: uplink scheduling grant information, downlink scheduling grant information, power control information, sending or receiving parameter configuration information, feedback triggering indication information, or pilot triggering indication information.

The measurement feedback information may be CSI or BSI.

The uplink control information may further be a reply message for downlink transmission, and correspondingly, the downlink control information is at least one of: uplink scheduling grant information, downlink scheduling grant information, power control information, sending or receiving parameter configuration information, feedback triggering indication information, or pilot triggering indication information.

The uplink control information may further be uplink or downlink beam handover request indication information, and correspondingly, the downlink control information is at least one of: uplink scheduling grant information, downlink scheduling grant information, power control information, sending or receiving parameter configuration information, feedback triggering indication information, or pilot triggering indication information.

The uplink control information may further be link quality state information, and correspondingly, the downlink control information is at least one of: uplink scheduling grant information, downlink scheduling grant information, power control information, sending or receiving parameter configuration information, feedback triggering indication information, or pilot triggering indication information.

The uplink control information may further be an SR, and correspondingly, the associated downlink control information is at least one of: uplink scheduling grant information, downlink scheduling grant information, power control information, sending or receiving parameter configuration information, feedback triggering indication information, or pilot triggering indication information.

In an embodiment, the uplink information may be uplink data information, and correspondingly, the downlink information is downlink control information or downlink data information.

In an embodiment, the uplink information is uplink random access information, and correspondingly, the downlink information is at least one of: downlink control information, downlink data information, or downlink random access response information.

In practical applications, the uplink information may further be the uplink control information, and correspondingly, the downlink information is the downlink data information.

In practical applications, an association relationship of information may be configured by the base station, or may be pre-agreed by the terminal and the base station.

That is, the downlink information associated with the uplink information is determined based on the configured or pre-agreed association relationship of information.

The association relationship of transmission configuration information, that is, an association relationship between the sending configuration information corresponding to the downlink information and the sending configuration information corresponding to the uplink information associated with the downlink information, may be pre-agreed or configured by the base station.

That is, in the step 202, according to the configured or pre-agreed association relationship of transmission configuration information and in conjunction with the third sending configuration information the base station determines the fourth sending configuration information corresponding to the downlink information associated with the uplink information.

In practical applications, the downlink sending configuration information may include at least one of: a configuration of numerology, a configuration of transmission area, a configuration of sending code sequence set, a configuration of sending power, a configuration of sending times, a configuration of sending resource quantity, a configuration of modulation manner, a configuration of coding manner, a configuration of sending manner, a configuration of receiving manner, a configuration of transmission technology, or a configuration of demodulation pilot.

It is to be illustrated that the uplink refers to a direction in which the terminal sends information to the base station; and the downlink refers to a direction in which the base station sends information to the terminal.

The information sending method provided in this embodiment determines third sending configuration information corresponding to uplink information, determines fourth sending configuration information corresponding to downlink information associated with the uplink information according to the third sending configuration information, and sends the downlink information according to the fourth sending configuration information. In the process of sending downlink information, the association between the uplink and downlink when are affected by the moving or blocking is considered, thereby effectively improving the transmission performance.

Embodiment 3

On the basis of the embodiments 1 and 2, this embodiment will describe in detail specific contents of the sending configuration information configured by the base station.

That is, this embodiment mainly describes some configuration types included in a transmission configuration set. These configuration types mainly include: a configuration of numerology, a configuration of transmission area, a configuration of sending code sequence set, a configuration of sending power, a configuration of sending times, a configuration of sending resource quantity, a configuration of modulation manner, a configuration of coding manner, a configuration of sending manner, a configuration of receiving manner, a configuration of transmission technology, or a configuration of demodulation pilot.

The various configurations are described below.

(1) Configuration of Numerology

Generally, in a wireless communication system based on orthogonal frequency division multiplexing (OFDM), basic transmission parameters corresponding to the numerology mainly include some categories described below.

1. Time domain symbol length: refers to a length of an OFDM symbol. Modulation symbols are carried on M OFDM subcarriers, these subcarriers constitute a time domain sample point after transformed to the time domain, and the time domain sample point and a guard period form a time domain OFDM symbol. Generally, the length of the OFDM symbol is related to the number and spacing of subcarriers in the frequency domain. In the same bandwidth, the larger the number of subcarriers is and the smaller the spacing is, then the longer the length of the OFDM symbol is. Alternatively, it may also be described as: in a case with the same subcarrier spacing, the larger the number of subcarriers is, the longer the length of the OFDM symbol is, and vice versa.
2. The number of subcarriers: refers to the number of subcarriers carrying the modulation symbols in the frequency domain corresponding to the same one OFDM symbol.
3. Subcarrier spacing: refers to a spacing between center frequencies of the subcarriers. Generally, in order to maintain orthogonality, the smaller the subcarrier spacing is and the higher requirements of required waveform are, then the longer a window in the time domain is, so that the length of the time domain symbol is longer, and vice versa.
4. Frequency domain guard band: refers to that some bandwidths on both sides are generally reserved as guard bands during information transmission. For example, only 100 resource blocks (RBs) are actually used in the current long term evolution (LTE) system with a 20 MHz bandwidth, then only 1200 subcarriers, that is, total 18 MHz bandwidth, are occupied, which means that 2 MHz guard bands are reserved. The guard bands are generally on both sides of the bandwidth and are mainly used for avoiding impact on performance due to out-of-band leak when other wireless communication systems send information.
5. Cyclic prefix (CP): generally refers to some prefixes added in the front of some time domain sample points formed after the frequency domain signals are transformed into the time domain. The prefixes generally are copies of latter part of sample points of a string of time domain sample points. For example, a string of signals 0, 1, 2, 3, 4, 5, 6, 7, 8 and 9 to which a cyclic prefix with a length of 4 is added is 6, 7, 8, 9, 0, 1, 2, 3, 4, 5, 6, 7, 8 and 9.
6. Time domain guard period (GP): during radio frequency (RF) precoding, switching from one precoding to another precoding requires a certain period of processing time, so that similar guard periods are also required. Although some other places also have similar concepts of the guard period, various guard periods in the present disclosure are all considered as one type of basic transmission parameters.
7. The number of points in fast Fourier transform (FFT) algorithm: is generally related to the number of subcarriers and the bandwidth of a baseband, but is not completely equal to the number of active subcarriers. For example, for a 20 MHz/10 MHz LTE system, FFT points respectively uses 2048 points and 1024 points, but the number of active subcarriers is just 1200 and 600 respectively.

(2) Configuration of Transmission Area

The configuration of transmission area includes a configuration of time domain transmission area, for example, the configuration on which sub-frame group, on which slot group, or on which OFDM symbol group. The configuration of transmission area may further include a configuration of frequency domain transmission area, for example, the configuration on which subcarrier groups. Or, a combination of two characterized transmission areas, for example, the configuration on which resource block (RB) groups of which subframes. The configuration of transmission area may further include that the transmission is performed on which subcarrier.

(3) Configuration of Sending Code Sequence Set

The sending code sequence is also a kind of resource, so that which code sequences are available is also one candidate configuration of transmission resource and may also be considered as one type of transmission configuration.

(4) Configuration of Sending Power

In practical applications, the sending power may be absolute power or power of other signals or channels.

(5) Configuration of Sending Times

Some pieces of information may be repeatedly sent continuously so as to acquire higher robustness, and the sending times are one type of transmission configuration.

(6) Configuration of Sending Resource Quantity

Different sending resource quantities correspond to different robustness, and the information is sent by using larger resource quantities so as to acquire higher robustness, so that the sending resource quantity is one type of transmission configuration.

(7) Configuration of Modulation Manner

The modulation manner includes binary phase shift keying (BPSK), quadrature phase shift keying (QPSK) and other modulation manners.

(8) Configuration of Coding Manner

The coding manner includes a code rate, a coding type, and an aggregation level of control information.

(9) Configuration of Sending Manner

The configuration of sending manner includes: a configuration of a sending beam, a configuration of a sending antenna, a configuration of a sending sector, and a configuration of transmission technology or mode.

(10) Configuration of Receiving Manner

The configuration of receiving manner includes: a configuration of a receiving beam, a configuration of a receiving antenna, a configuration of a receiving sector and a configuration of a receiving manner.

(11) Configuration of Transmission Technology

The configuration of transmission technology includes diversity transmission, open-loop precoding, closed-loop precoding, semi-open-loop semi-closed-loop precoding, multi-beam transmission, single-beam transmission, transmission of pilot and data both with the same precoding, and transmission of pilot and data with different precoding.

(12) Configuration of Demodulation Pilot

The configuration of demodulation pilot includes a density and a location of the modulation pilot.

Embodiment 4

This embodiment mainly considers that the uplink control information and the downlink control information are associated, that is, a transmission configuration of one type of control information is determined according to a transmission configuration of the other type of control information.

In practical applications, in the downlink, the base station is required to send physical layer configuration signaling to the terminal, and the signaling includes several types of information described below.

(1) Downlink Grant Information (DL Grant)

The DL grant information includes a lot of pieces of information, such as a data channel resource allocation, a modulation coding scheme, a configuration of a transmission layer, a configuration of a pilot port and a retransmission indication, etc.

That is, information related to the downlink transmission substantially belongs to the DL grant information.

(2) Uplink Grant Information (UL Grant)

The UL grant information includes a lot of pieces of information, such as a data channel resource allocation, a modulation coding scheme, a configuration of a transmission layer, a configuration of a pilot port and a retransmission indication, etc.

That is, information related to the uplink transmission substantially belongs to the UL grant information.

(3) Reply Message for Uplink Transmission

The reply message mainly has several states, e.g., acknowledgement (ACK) and non-acknowledgement (NACK), and is used for replying control information or a data block sent previously.

For the data block, generally, the ACK is fed back after the data block is received and correctly decoded, the NACK is fed back when the data block is received but incorrectly decoded, and nothing is fed back when no data block is received.

For the control information, there are three situations: the first is that, like the data channel, the ACK is fed back after the control information is received and correctly decoded, and the NACK is fed back when the control information is received but incorrectly decoded; the second is that the ACK is fed back only after the control information is received and correctly decoded, and nothing is fed back in other situations; and the third is that the NACK is fed back only when the control information is received but incorrectly decoded, and nothing is fed back in other situations.

The reply object may be various kinds of uplink information, such as the uplink control information, the uplink data information, and the like.

(4) Power Control Parameter Configuration

The power control parameter configuration includes information about downlink power parameter configuration and uplink power parameter configuration. When the information occurs together with the DL grant/UL grant, it may be considered that the information is a part of the DL grant/UL grant, but in some situations, the information occurs independently. The information is used for adjusting power of a control channel or a pilot, or for adjusting power of multiple user equipments (UEs).

(5) Sending or Receiving Parameter Configuration

Some typical parameters of the sending or receiving parameter configuration include: a configuration of a sending beam, a configuration of a sending antenna, a configuration of a sending sector, a configuration of a transmission technology or mode, a configuration of a receiving beam, a configuration of a receiving antenna, a configuration of a receiving sector, and a configuration of a receiving manner. The sending or receiving parameter configuration may further include some indications of quasi-co-location relationship for indicating the parameter similar to a sending or receiving parameter of transmission of a previous signal.

(6) Feedback Triggering Indication Information

The feedback triggering indication information includes CSI and BSI triggering indication information.

The CSI triggering indication information includes a rank selection indication, a measurement pilot selection, a precoding selection indication, and a channel quality indication.

The BSI triggering indication information includes a beam selection indication and a beam quality indication.

In fact, the BSI information may also be understood as a generalized CSI.

(7) Pilot Triggering Indication Information

The pilot triggering indication information includes: downlink pilot triggering indication information and uplink pilot triggering indication information. The downlink pilot triggering indication information may be triggering indication information of downlink measurement pilot-channel state information measurement pilot (CSI-RS), etc. The uplink pilot triggering indication information may be triggering indication information of an uplink sounding reference signal (SRS).

For the uplink, the terminal is required to feed back to the base station some pieces of information which the base station does not know and some request messages initiated by the terminal, mainly including several types of information described below.

(1) Reply Message

The reply message mainly has several states, e.g., ACK and NACK, and is used for replying control information or a data block sent previously.

For the data block, generally, the ACK is fed back after the data block is received and correctly decoded, the NACK is fed back when the data block is received but incorrectly decoded, and nothing is fed back when no data block is received.

For the control information, there are three situations: the first is that, like the data channel, the ACK is fed back after the control information is received and correctly decoded, and the NACK is fed back when the control information is received but incorrectly decoded; the second is that the ACK is fed back only after the control information is received and correctly decoded, and nothing is fed back in other situations; and the third is that the NACK is fed back only when the control information is received but incorrectly decoded, and nothing is fed back in other situations.

In practical applications, a reply object of the reply message may be various kinds of downlink information, such as the downlink control information and the downlink data information.

(2) Scheduling Request Message

The scheduling request message is mainly used for a UE to initiate a scheduling request to the base station.

(3) CSI

The CSI is a general term and includes various types of CSI, such as quantization information of a channel matrix, quantization information of a feature vector of a channel, a channel quality indicator (CQI), and an interference measurement result, as well as a precoding matrix indicator (PMI), a rank indicator (RI), feedback information of the number of precoding layers, a channel state information reference signal resource indicator (CRI), port selection information, and measurement resource location indication information, etc. This kind of information is usually obtained by being measured based on a measurement pilot. In some situations, the modulation pilot has the CSI measurement and modulation functions.

(4) BSI

The BSI includes beam selection information and beam measurement information, which may be considered to be one kind of the CSI. This kind of information is also obtained by being measured based on the measurement pilot.

(5) Sending Manner Handover Request Information

This information is mainly used for the terminal to request the base station to hand over a sending manner. The sending manner includes a sending node, a sending beam, a transmission technology, a sending antenna, a sending sector, etc.

(6) Receiving manner handover request information

This information is mainly used for the terminal to notify the base station to switch a receiving manner. The receiving manner includes a receiving beam, a receiving antenna, a receiving sector, etc.

(7) Link Quality Information

The terminal may measure the quality of the transmission link, and report it to a sending end.

By using the control information described above, the transmission configuration of the uplink configuration information may be determined according to the transmission configuration of the downlink control information.

Specifically, the control information of the downlink transmission is associated with the control information of the uplink transmission. The association relationship may be pre-agreed or configured by the base station. When a transmission configuration is selected for transmission of the downlink control information, transmission of the associated uplink control information is also required to adopt the corresponding transmission configuration. The corresponding relationship of the transmission configurations is configured by the base station or is pre-agreed by both parties.

The specific information of the downlink control information and the uplink control information, which have the association relationship, may refer to the description in the embodiment 1.

The association of transmission configurations may be one of associations described below.

An association of sending power: for example, the downlink control information adopts high sending power, and the associated uplink control information adopts the high sending power.

An association of sending beam: for example, the downlink control information adopts multiple beams, and the associated uplink control information adopts multiple beams; or an index of the downlink sending beam and an index of the uplink sending beam have an association.

An association of transmission technology: for example, the downlink control information adopts a diversity transmission, and the associated uplink control information adopts the diversity transmission.

An association of modulation coding scheme: for example, the modulation coding scheme adopted by the downlink control information is BPSK, and the associated uplink control information adopts the BPSK.

An association of transmission area: for example, the downlink control information is detected in a downlink area A, and the associated uplink control information is sent in a corresponding associated uplink area.

An association of the number of repetitions: for example, the downlink control information is sent repeatedly N times, and the associated uplink control information is sent repeatedly M times in the uplink. M is determined according to N, for example, M=N or M=2N.

An association of numerology: for example, the downlink control information adopts a longer CP length, and the associated uplink control information also adopts a longer CP configuration in the uplink.

An association of sending resource quantity: for example, the downlink control information adopts more sending resources, and the associated uplink control information in the uplink also adopts more sending resources.

Of course, in practical applications, there may be associations on other transmission configuration aspects.

Similarly, by using the control information described above, the transmission configuration of the downlink configuration information may be determined according to the transmission configuration of the uplink control information.

Specifically, the control information of the uplink transmission is associated with the control information of the downlink transmission. The association relationship may be pre-agreed or configured by the base station. When the uplink control information transmission selects a transmission configuration, the associated downlink control information transmission is also required to adopt the corresponding transmission configuration. The corresponding relationship of the transmission configurations is configured by the base station, or is pre-agreed by both parties.

The specific information of the downlink control information and the uplink control information, which have the association relationship, may refer to the description in the embodiment 1.

The association of transmission configurations may be one of associations described below.

An association of sending power: for example, the uplink control information adopts high sending power, and the associated downlink control information adopts the high sending power.

An association of sending beam: for example, the uplink control information adopts multiple beams, and the associated downlink control information adopts multiple beams; or an index of the downlink sending beam and an index the uplink sending beam have an association.

An association of transmission technology: for example, the uplink control information adopts diversity transmission, and the associated downlink control information adopts the diversity transmission.

An association of modulation coding scheme: for example, the modulation coding scheme adopted by the uplink control information is BPSK, and the associated downlink control information adopts the BPSK.

An association of transmission area: for example, the uplink control information is detected in a downlink area A, and the associated downlink control information is sent in a corresponding associated uplink area.

An association of the number of repetitions: for example, the uplink control information is sent repeatedly N times, and the associated downlink control information is sent repeatedly M times in the downlink. M is determined according to N, for example, M=N or M=2N.

An association of numerology: for example, the uplink control information adopts a longer CP length, and the associated downlink control information also adopts a longer CP configuration in the downlink.

An association of sending resource quantity: for example, the uplink control information adopts more sending resources, and the associated downlink control information also adopts more sending resources in the downlink.

Of course, in practical applications, there may be associations on other transmission configuration aspects.

Embodiment 5

In this embodiment, the downlink control information and the uplink data information may be associated. The association relationship may be pre-agreed or configured by the base station. For example, the downlink control information is the UL grant, and the uplink data information is transmission data which is granted by the UL grant. When the downlink control information selects a transmission configuration, the associated uplink data information is also required to adopt the corresponding transmission configuration. The corresponding relationship of the transmission configurations is configured by the base station or is pre-agreed by both parties.

Embodiment 6

In this embodiment, the downlink control information and the uplink pilot information are associated. The association relationship may be pre-agreed or configured by the base station. For example, the downlink control information is the uplink pilot configuration information or the uplink pilot triggering information, and the uplink pilot is the uplink SRS. When the downlink control information selects a transmission configuration, the associated uplink pilot information is also required to adopt the corresponding transmission configuration. The corresponding relationship of the transmission configurations is configured by the base station, or is pre-agreed by both parties.

The downlink control information may further be associated with the uplink pilot information.

The association relationship may be pre-agreed or configured by the base station. For example, the downlink control information is the power control information, and the uplink pilot is the uplink SRS. When the downlink control information selects a transmission configuration, the associated uplink pilot information is also required to adopt the corresponding transmission configuration. The corresponding relationship of the transmission configurations is configured by the base station, or is pre-agreed by both parties.

Embodiment 7

In this embodiment, the downlink control information and the uplink random access information are associated. The association relationship may be pre-agreed or configured by the base station. For example, the downlink control information is the random access configuration information or the random access triggering information. When the downlink control information selects a transmission configuration, the associated uplink random access information is also required to adopt the corresponding transmission configuration. The corresponding relationship of the transmission configurations is configured by the base station, or is pre-agreed by both parties.

Embodiment 8

In this embodiment, the downlink data information and the uplink control information are associated. The association relationship may be pre-agreed or configured by the base station. When the downlink data information selects a transmission configuration, the associated uplink control information is also required to adopt the corresponding transmission configuration. The corresponding relationship of the transmission configurations is configured by the base station, or is pre-agreed by both parties.

The downlink data information may further be associated with the uplink data information. The association relationship may be pre-agreed or configured by the base station. When the downlink data information selects a transmission configuration, the associated uplink data information is also required to adopt the corresponding transmission configuration. The corresponding relationship of the transmission configurations is configured by the base station, or is pre-agreed by both parties.

Embodiment 9

In this embodiment, the downlink data information and the uplink random access information are associated. The association relationship may be pre-agreed or configured by the base station. When the downlink data information selects a transmission configuration, the associated uplink random access information is also required to adopt the corresponding transmission configuration. The corresponding relationship of the transmission configurations is configured by the base station, or is pre-agreed by both parties.

Embodiment 10

In this embodiment, the uplink data information and the downlink control information are associated. The association relationship may be pre-agreed or configured by the base station. When the uplink data information selects a transmission configuration, the associated downlink control information is also required to adopt the corresponding transmission configuration. The corresponding relationship of the transmission configurations is configured by the base station, or is pre-agreed by both parties.

Embodiment 11

In this embodiment, the uplink random access information and the downlink control information are associated.

The association relationship may be pre-agreed or configured by the base station. When the uplink random access information selects a transmission configuration, the associated downlink control information is also required to adopt the corresponding transmission configuration. The corresponding relationship of the transmission configurations is configured by the base station, or is pre-agreed by both parties.

Embodiment 12

In this embodiment, the uplink control information and the downlink data information are associated. The association relationship may be pre-agreed or configured by the base station.

When the uplink control information selects a transmission configuration, the associated downlink data information is also required to adopt the corresponding transmission configuration. The corresponding relationship of the transmission configurations is configured by the base station, or is pre-agreed by both parties.

Embodiment 13

In this embodiment, the uplink data information and the downlink data information are associated. The association relationship may be pre-agreed or configured by the base station. When the uplink data information selects a transmission configuration, the associated downlink data information is also required to adopt the corresponding transmission configuration. The corresponding relationship of the transmission configurations is configured by the base station, or is pre-agreed by both parties.

Embodiment 14

In this embodiment, the uplink random access information and the downlink data information are associated. The association relationship may be pre-agreed or configured by the base station. When the uplink random information selects a transmission configuration, the associated downlink data information is also required to adopt the corresponding transmission configuration. The corresponding relationship of the transmission configurations is configured by the base station, or is pre-agreed by both parties.

Embodiment 15

In this embodiment, the uplink random access information and the downlink random access response information are associated. The association relationship may be pre-agreed or configured by the base station. When the uplink random information selects a transmission configuration, the associated downlink random access response information is also required to adopt the corresponding transmission configuration. The corresponding relationship of the transmission configurations is configured by the base station, or is pre-agreed by both parties.

From the above description, the solutions of the embodiments of the present disclosure may associate the transmission configurations of the uplink and the downlink. In this way, when one end finds a problem, the transmission of the other end may be affected, and then the other end may adopt a transmission configuration matching the end which finds the problem, thereby enabling the system to have better robustness and improving the transmission performance.

Embodiment 16

Figure 3:
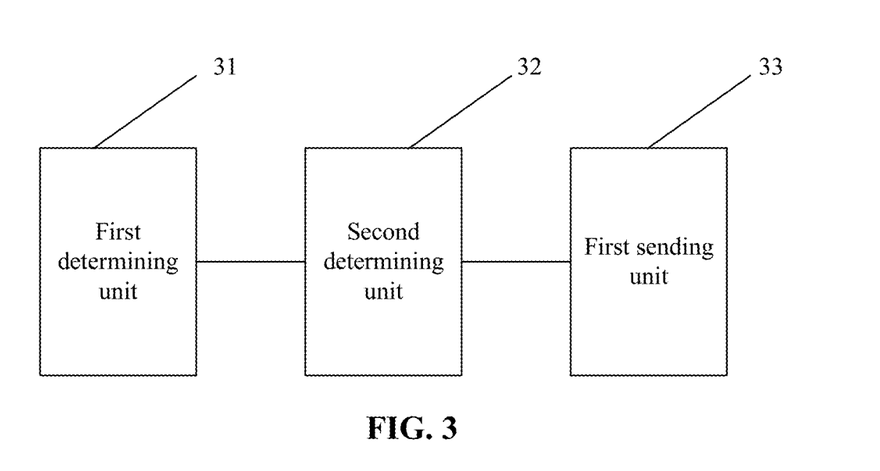
FIG. 3 is a structural diagram of an information sending apparatus according to an embodiment 16 of the present disclosure.

In order to implement the method described in the embodiments of the present disclosure, this embodiment provides an information sending apparatus. The apparatus is disposed in a terminal and, as shown in FIG. 3, includes a first determining unit 31, a second determining unit 32 and a first sending unit 33.

The first determining unit 31 is configured to determine first sending configuration information corresponding to downlink information.

The second determining unit 32 is configured to determine, according to the first sending configuration information, second sending configuration information corresponding to uplink information associated with the downlink information.

The first sending unit 33 is configured to send the uplink information according to the second sending configuration information.

In an embodiment, the apparatus may further include a third determining unit.

The third determining unit is configured to determine the uplink information associated with the downlink information based on a configured or pre-agreed association relationship of information.

In practical applications, the second determining unit 32 is specifically configured to: determine according to a configured or pre-agreed association relationship of transmission configuration information and in conjunction with the first sending configuration information the second sending configuration information corresponding to the uplink information associated with the downlink information.

It is to be illustrated that the corresponding relationship between uplink information and downlink information and the association relationship of the transmission configuration information have been described above and will not be repeated herein.

In practical applications, the first determining unit 31, the second determining unit 32 and the third determining unit may be implemented by a central processing unit (CPU), a micro control unit (MCU), a digital signal processor (DSP) or a field-programmable gate array (FPGA) in the information sending apparatus. The first sending unit 33 may be implemented by a communication chip (which may be understood as a communicator) in the information sending apparatus.

Embodiment 17

Figure 4:
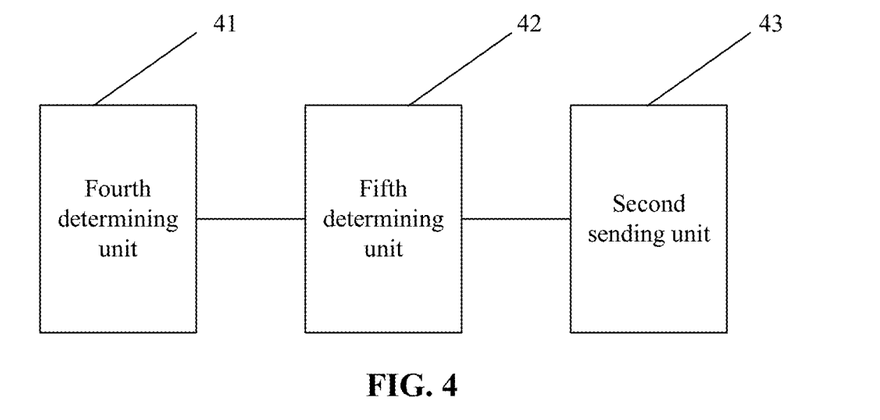
FIG. 4 is a structural diagram of an information sending apparatus according to an embodiment 17 of the present disclosure.

In order to implement the method described in the embodiments of the present disclosure, this embodiment provides an information sending apparatus. As shown in FIG. 4, the apparatus includes a fourth determining unit 41, a fifth determining unit 42 and a second sending unit 43.

The fourth determining unit 41 is configured to determine third sending configuration information corresponding to uplink information.

The fifth determining unit 42 is configured to determine, according to the third sending configuration information, fourth sending configuration information corresponding to downlink information associated with the uplink information.

The second sending unit 43 is configured to send the downlink information according to the fourth sending configuration information.

In an embodiment, the apparatus may further include a sixth determining unit.

The sixth determining unit is configured to determine the downlink information associated with the uplink information based on a configured or pre-agreed association relationship of information.

In practical applications, the fifth determining unit 42 is specifically configured to: determine, according to a configured or pre-agreed association relationship of transmission configuration information and in conjunction with the third sending configuration information, the fourth sending configuration information corresponding to the downlink information associated with the uplink information.

In practical applications, the fourth determining unit 41, the fifth determining unit 42 and the sixth determining unit may be implemented by the CPU, the MCU, the DSP or the FPGA in the information sending apparatus. The second sending unit 43 may be implemented by the communication chip (which may be understood as the communicator) with the CPU, the MCU, the DSP or the FPGA in the information sending apparatus.

It is to be illustrated that the corresponding relationship between uplink information and downlink information and the association relationship of the transmission configuration information have been described above and will not be repeated herein.

Embodiment 18

Figure 5:
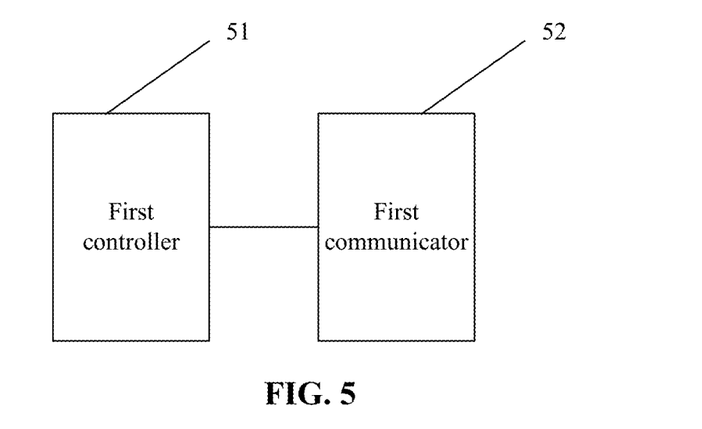
FIG. 5 is a schematic diagram of a hardware structure of a terminal according to an embodiment 18 of the present disclosure.

In order to implement the method of the embodiments of the present disclosure, as shown in FIG. 5, the hardware structure of the terminal includes a first controller 51 and a first communicator 52.

The first controller 51 is configured to determine first sending configuration information corresponding to downlink information, and determine, according to the first sending configuration information, second sending configuration information corresponding to uplink information associated with the downlink information.

The first communicator 52 is configured to send the uplink information according to the second sending configuration information.

The first controller 51 is further configured to determine the uplink information associated with the downlink information based on a configured or pre-agreed association relationship of information.

The first controller 51 is specifically configured to: determine, according to a configured or pre-agreed association relationship of transmission configuration information and in conjunction with the first sending configuration information, the second sending configuration information corresponding to the uplink information associated with the downlink information.

It is to be illustrated that the corresponding relationship between uplink information and downlink information and the association relationship of the transmission configuration information in this embodiment have been described above and will not be repeated herein.

Embodiment 19

Figure 6:
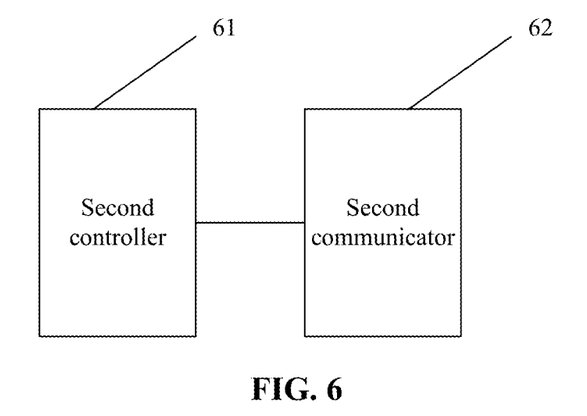
FIG. 6 is a schematic diagram of a hardware structure of a base station according to an embodiment 19 of the present disclosure.

In order to implement the method of the embodiments of the present disclosure, as shown in FIG. 6, the hardware structure of the terminal includes a second controller 61 and a second communicator 62.

The second controller 61 is configured to determine third sending configuration information corresponding to uplink information, and determine, according to the third sending configuration information, fourth sending configuration information corresponding to downlink information associated with the uplink information.

The second communicator 62 is configured to send the downlink information according to the fourth sending configuration information.

The second controller 61 is further configured to determine the downlink information associated with the uplink information based on a configured or pre-agreed association relationship of information.

The second controller 61 is specifically configured to: determine, according to a configured or pre-agreed association relationship of transmission configuration information and in conjunction with the third sending configuration information, the fourth sending configuration information corresponding to the downlink information associated with the uplink information.

It is to be illustrated that the corresponding relationship between uplink information and downlink information and the association relationship of the transmission configuration information have been described above and will not be repeated herein.

Embodiment 20

Figure 7:
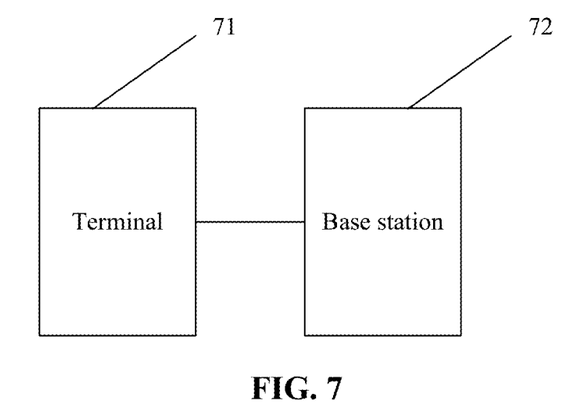
FIG. 7 is a structural diagram of an information sending system according to an embodiment 20 of the present disclosure.

In order to implement the method of the embodiments of the present disclosure, this embodiment provides an information sending system. As shown in FIG. 7, the system includes a terminal 71 and a base station 72.

The terminal 71 is configured to determine first sending configuration information corresponding to first downlink information, determine, according to the first sending configuration information, second sending configuration information corresponding to first uplink information associated with the first downlink information, and send the first uplink information according to the second sending configuration information.

The base station 72 is configured to determine third sending configuration information corresponding to the first uplink information, determine, according to the third sending configuration information, fourth sending configuration information corresponding to second downlink information associated with the first uplink information, and send the second downlink information according to the fourth sending configuration information.

The terminal 71 is further configured to determine the first uplink information associated with the first downlink information based on a configured or pre-agreed association relationship of information.

The base station 72 is further configured to determine the second downlink information associated with the first uplink information based on a configured or pre-agreed association relationship of information.

It is to be illustrated that the corresponding relationship between uplink information and downlink information and the association relationship of the transmission configuration information have been described above and will not be repeated herein.

The specific processing procedures of the terminal 71 and the base station 72 have been described above in detail, and will not be repeated herein.

It should be understood by those skilled in the art that the embodiments of the present disclosure may be provided as methods, systems, or computer program products. Therefore, the present disclosure may adopt a mode of a hardware embodiment, a software embodiment, or a combination of hardware and software embodiments. In addition, the present disclosure may take a form of a computer program product which is implemented on one or more computer-usable storage media (including, but not limited to, a disk memory, an optical memory and the like) having computer-usable program codes.

The present disclosure is described with reference to flowcharts and/or block diagrams of methods, devices (systems) and computer program products according to the embodiments of the present disclosure. It should be understood that computer program instructions implement each flow and/or block in the flowcharts and/or block diagrams and a combination of flows and/or blocks in the flowcharts and/or block diagrams. These computer program instructions can be provided to a general-purpose computer, a special-purpose computer, an embedded processor or a processor of another programmable data processing device to produce a machine so that instructions executed by a computer or the processor of another programmable data processing device produce a means for implementing functions specified in one or more flows in the flowcharts and/or one or more blocks in the block diagrams.

These computer program instructions can also be stored in a computer-readable memory which can direct the computer or another programmable data processing device to operate in a particular manner so that the instructions stored in the computer-readable memory produce a manufactured product including an instructing means. The instructing means implements the functions specified in one or more flows in the flowcharts and/or one or more blocks in the block diagrams.

These computer program instructions can also be loaded onto the computer or another programmable data processing device so that a series of operation steps are performed on the computer or another programmable device to produce processing implemented by the computer. Therefore, instructions executed on the computer or another programmable device provide steps for implementing the functions specified in one or more flows in the flowcharts and/or one or more blocks in the block diagrams.

On the basis of this, in an exemplary embodiment, the embodiments of the present disclosure further provide a computer-readable storage medium configured to store computer-executable instructions for executing the steps of the above-mentioned method on the terminal side or the steps of the above-mentioned method on the base station side when executed by a processor.

The above are only preferred embodiments of the present disclosure and are not intended to limit the scope of the present disclosure.

What is claimed is:

1. An information sending method, comprising:
   determining first sending configuration information corresponding to downlink information, wherein the first sending configuration information refers to a transmission configuration adopted for transmission of the downlink information;
   determining, according to the first sending configuration information, second sending configuration information corresponding to uplink information associated with the downlink information, wherein the second sending configuration information refers to a transmission configuration adopted for transmission of the uplink information; and
   sending the uplink information according to the second sending configuration information.

2. The method according to claim 1, wherein the downlink information is downlink control information, and the uplink information is uplink control information.

3. The method according to claim 2, wherein the downlink control information is uplink scheduling grant information, and the uplink control information is at least one of:
   measurement feedback information, a reply message for downlink transmission, uplink or downlink beam handover request indication information, or link quality state information; or
   the downlink control information is downlink scheduling grant information, and the uplink control information is at least one of: measurement feedback information, a reply message for downlink transmission, a scheduling request (SR) message, uplink or downlink beam handover request indication information, or link quality state information; or
   the downlink control information is a reply message for uplink transmission, and the uplink control information is at least one of: measurement feedback information, a reply message for downlink transmission, an SR message, uplink or downlink beam handover request indication information, or link quality state information; or
   the downlink control information is power control parameter configuration information, and the uplink control information is at least one of: uplink measurement feedback information, uplink or downlink beam handover request indication information, a reply message for downlink transmission, or link quality state information; or
   the downlink control information is sending or receiving parameter configuration indication information, and the uplink control information is at least one of: measurement feedback information, a reply message for downlink transmission, or an SR message; or
   the downlink control information is feedback triggering indication information, and the uplink control information is uplink feedback information triggered by the feedback triggering indication information; or
   the downlink control information is pilot triggering indication information, and the uplink control information is feedback information corresponding to measuring based on the pilot.

4. The method according to claim 1, wherein the downlink information is downlink control information, and the uplink information is at least one of:
   uplink data information, uplink pilot information, or uplink random access information.

5. The method according to claim 4, wherein in response to determining that the uplink information is the uplink random access information, the downlink control information is at least one of:
   random access configuration information, or random access triggering information; or
   in response to determining that the uplink information is the uplink pilot information, and the downlink control information is at least one of: uplink pilot configuration information, uplink pilot triggering information, or power control parameter configuration information.

6. The method according to claim 1, wherein the downlink information is downlink data information, and the uplink information is at least one of:
   uplink control information, uplink data information, or uplink random access information.

7. The method according to claim 1, further comprising:
   determining the uplink information associated with the downlink information based on a configured or pre-agreed association relationship of information.

8. The method according to claim 1, wherein determining, according to the first sending configuration information, the second sending configuration information corresponding to the uplink information associated with the downlink information comprises:

according to a configured or pre-agreed association relationship of transmission configuration information and in conjunction with the first sending configuration information, determining the second sending configuration information corresponding to the uplink information associated with the downlink information.

9. The method according to claim 1, wherein the second sending configuration information comprises at least one of:

a configuration of numerology, a configuration of transmission area, a configuration of sending code sequence set, a configuration of sending power, a configuration of sending times, a configuration of sending resource quantity, a configuration of modulation manner, a configuration of coding manner, a configuration of sending manner, a configuration of receiving manner, a configuration of transmission technology, or a configuration of demodulation pilot.

10. A non-transitory computer-readable storage medium, which is configured to store computer programs that, when executed by a processor, implement the steps of the method of claim 1.

11. An information sending method, comprising:

determining third sending configuration information corresponding to uplink information, wherein the third sending configuration information refers to a transmission configuration adopted for transmission of the uplink information;

determining, according to the third sending configuration information, fourth sending configuration information corresponding to downlink information associated with the uplink information, wherein the fourth sending configuration information refers to a transmission configuration adopted for transmission of the downlink information; and sending the downlink information according to the fourth sending configuration information.

12. The method according to claim 11, wherein the uplink information is uplink control information, and the associated downlink information is downlink control information.

13. The method according to claim 12, wherein the uplink control information is measurement feedback information, and the downlink control information is at least one of:

uplink scheduling grant information, downlink scheduling grant information, power control information, sending or receiving parameter configuration information, feedback triggering indication information, or pilot triggering indication information; or the uplink control information is a reply message for downlink transmission, and the downlink control information is at least one of: uplink scheduling grant information, downlink scheduling grant information, power control information, sending or receiving parameter configuration information, feedback triggering indication information, or pilot triggering indication information; or the uplink control information is uplink or downlink beam handover request indication information, and the downlink control information is at least one of: uplink scheduling grant information, downlink scheduling grant information, power control information, sending or receiving parameter configuration information, feedback triggering indication information, or pilot triggering indication information; or the uplink control information is uplink or downlink beam handover request indication information, and the downlink control information is at least one of: uplink scheduling grant information, downlink scheduling grant information, power control information, sending or receiving parameter configuration information, feedback triggering indication information, or pilot triggering indication information; or the uplink control information is uplink or downlink beam handover request indication information, and the downlink control information is at least one of: uplink scheduling grant information, downlink scheduling grant information, power control information, sending or receiving parameter configuration information, feedback triggering indication information, or pilot triggering indication information.

14. The method according to claim 11, wherein the uplink information is uplink data information, and the downlink information is at least one of:

downlink control information, or downlink data information; or the uplink information is uplink random access information, and the downlink information is at least one of: downlink control information, downlink data information, or downlink random access response information; or the uplink information is uplink control information, and the downlink information is downlink data information.

15. The method according to claim 11, further comprising:

determining the downlink information associated with the uplink information based on a configured or pre-agreed association relationship of information.

16. The method according to claim 11, wherein determining, according to the third sending configuration information, the fourth sending configuration information corresponding to the downlink information associated with the uplink information comprises:

according to a configured or pre-agreed association relationship of transmission configuration information and in conjunction with the third sending configuration information, determining the fourth sending configuration information corresponding to the downlink information associated with the uplink information.

17. The method according to claim 11, wherein the fourth downlink sending configuration information comprises at least one of:

a configuration of numerology, a configuration of transmission area, a configuration of sending code sequence set, a configuration of sending power, a configuration of sending times, a configuration of sending resource quantity, a configuration of modulation manner, a configuration of coding manner, a configuration of sending manner, a configuration of receiving manner, a configuration of transmission technology, or a configuration of demodulation pilot.

18. An information sending apparatus, comprising: a processor and a storage device, wherein the storage device stores processor-executable programs for executing the method according to claim 11.

19. An information sending apparatus, comprising:

a processor; and a memory for storing instructions executable by the processor, wherein the processor is configured to:

determine first sending configuration information corresponding to downlink information, wherein the first sending configuration information refers to a transmission configuration adopted for transmission of the downlink information;

determine, according to the first sending configuration information, second sending configuration information corresponding to uplink information associated with the downlink information, wherein the second sending configuration information refers to a transmission configuration adopted for transmission of the uplink information; and send the uplink information according to the second sending configuration information.

20. The apparatus according to claim 19, wherein the apparatus is arranged in a terminal.

* * * * *

UNITED STATES PATENT AND TRADEMARK OFFICE
CERTIFICATE OF CORRECTION

PATENT NO. : 11,425,749 B2
APPLICATION NO. : 16/346489
DATED : August 23, 2022
INVENTOR(S) : Yijian Chen It is certified that error appears in the above-identified patent and that said Letters Patent is hereby corrected as shown below:

In the Specification

Columns 16-17, Lines 64-67 (Column 16) thru 1-5 (Column 17), delete "ACK is fed back after the control information is received and correctly decoded, and the NACK is fed back when the control information is received but incorrectly decoded; the second is that the ACK is fed back only after the control information is received and correctly decoded, and nothing is fed back in other situations; and the third is that the NACK is fed back only when the control information is received but incorrectly decoded, and nothing is fed back in other situations." and insert the same on Column 16, Line 63 as a continuation of the same paragraph.

Columns 19-20, Lines 61-67 (Column 19) thru 1-3 (Column 20), delete "The association relationship may be pre-agreed or configured by the base station. For example, the downlink control information is the power control information, and the uplink pilot is the uplink SRS. When the downlink control information selects a transmission configuration, the associated uplink pilot information is also required to adopt the corresponding transmission configuration. The corresponding relationship of the transmission configurations is configured by the base station, or is pre-agreed by both parties." and insert the same on Column 19, Line 60 as a continuation of the same paragraph.

Column 21, Line 16-22 (approx.), delete "When the uplink control information selects a transmission configuration, the associated downlink data information is also required to adopt the corresponding transmission configuration. The corresponding relationship of the transmission configurations is configured by the base station, or is pre-agreed by both parties." and insert the same on Column 21, Line 15 (approx.) as a continuation of the same paragraph.

In the Claims

Column 28, Claim 13, Line 3-4, delete "uplink or downlink beam handover request indication information" and insert --link quality state information--.

Signed and Sealed this
Tenth Day of January, 2023

Katherine Kelly Vidal
*Director of the United States Patent and Trademark Office*

CERTIFICATE OF CORRECTION (continued)
U.S. Pat. No. 11,425,749 B2

Column 28, Claim 13, Line 11-12, delete "uplink or downlink beam handover request indication information" and insert --a scheduling request (SR) message--.